United States Patent [19]

Adriaenssens et al.

[11] Patent Number: 5,113,159

[45] Date of Patent: May 12, 1992

[54] COMMUNICATIONS TRANSMISSION SYSTEM INCLUDING FACILITIES FOR SUPPRESSING ELECTROMAGNETIC INTERFERENCE

[75] Inventors: Luc W. Adriaenssens; Harold W. Friesen; Wendell G. Nutt, all of Dunwoody; Kenneth B. Parks, Lilburn, all of Ga.

[73] Assignee: AT&T Bell Laboratories, Murray Hill, N.J.

[21] Appl. No.: 483,152

[22] Filed: Feb. 22, 1990

[51] Int. Cl.⁵ .............................. H04B 3/30
[52] U.S. Cl. ............................ 333/12; 333/4; 174/32; 174/34
[58] Field of Search .............. 333/1, 4, 5, 12; 174/32, 34; 178/63 D, 63 E; 379/415–417

[56] References Cited

U.S. PATENT DOCUMENTS

| | | | |
|---|---|---|---|
| 1,998,960 | 4/1935 | Kaar | 333/12 X |
| 2,026,308 | 12/1935 | Ganz | 333/12 X |
| 2,222,406 | 11/1940 | Crossley | 333/1 X |
| 2,280,950 | 4/1942 | Harder | 333/5 X |
| 3,731,234 | 5/1973 | Collins | 333/1 |
| 4,056,790 | 11/1977 | Pospischil et al. | 333/5 |
| 4,697,051 | 9/1987 | Beggs et al. | 174/34 X |
| 4,751,607 | 6/1988 | Smith | 361/119 |
| 4,755,629 | 7/1988 | Beggs et al. | 174/34 |
| 4,860,343 | 8/1989 | Zetena, Jr. | 174/34 X |
| 4,873,393 | 10/1989 | Friesen et al. | 174/34 |

Primary Examiner—Eugene R. LaRoche
Assistant Examiner—Benny Lee
Attorney, Agent, or Firm—Edward W. Somers

[57] ABSTRACT

A balanced mode transmission system (20) for use in a local area network includes at least one twisted pair of insulated metallic conductors (27—27) which at its end is connected through a transformer to a transmitting computer and to a receiving computer (48). Each pair of conductors adjacent to the transmitting end and optionally adjacent to the receiving end is provided with a longitudinal choke (56,57). Also, a longitudinally extending metallic wire (60) is included in the system and is connected possibly through a resistor to ground at each end. The combination of the longitudinal choke at least adjacent to the transmitting end and the longitudinally extending metallic wire is superbly effective in suppressing electromagnetic interference notwithstanding the absence of shielding.

27 Claims, 11 Drawing Sheets

COMMUNICATIONS TRANSMISSION SYSTEM INCLUDING FACILITIES FOR SUPPRESSING ELECTROMAGNETIC INTERFERENCE

TECHNICAL FIELD

This invention relates to a communications transmission system which includes facilities for combating electromagnetic interference. More particularly, the invention relates to an unshielded system for transmitting communications signals, the system including a voltage divider arrangement which is effective to suppress electromagnetic interference.

BACKGROUND OF THE INVENTION

In metallic conductor communicative transmission systems, a nagging problem has been electromagnetic interference (EMI). A metallic transmission medium between a transmitter and a receiver effectively is an antenna. As such, any signal on a pair of metallic conductors which connect the transmitter to the receiver may both radiate EMI and pick up EMI from other electrical equipment.

EMI pickup currents will be delivered to the receiver where they will interfere with the received signal. In a coaxial cable which comprises a solid, centrally disposed inner conductor and an outer tubular conductor separated from the inner conductor by a dielectric material, the outer conductor is effectively a shield which keeps currents inside and which also prevents the pickup of spurious external currents.

Radiated or outwardly directed EMI, that is, EMI outgoing from a transmission line, is undesired because of its adverse effects on reception by neighboring equipment. The Federal Communications Commission (FCC) has set limitations on the maximum signal that can be radiated. At high frequencies, particularly at those such as 16 megabits, for example, which are used in data transmission, the higher harmonics are most apt to cause outwardly directed EMI. Accordingly, it long has been sought to find arrangements for effectively combating EMI.

A first step toward combating EMI is balanced mode transmission. A pure balanced mode signal is one in which at any instant the voltage with respect to ground on one conductor of a pair is equal and of opposite polarity to the voltage of the other conductor of the pair. The balanced mode is sometimes referred to as the differential mode. On the other hand, a pure longitudinal mode signal is one in which at any instant the voltage with respect to ground on one conductor of a pair is equal to the voltage on the other conductor. A typical signal comprises a balanced mode component and a longitudinal mode component.

Traditional balanced mode systems include a Balun or transformer in the circuit at the transmitting end and at the receiving end. Transmitting in the balanced mode is acceptable except that the practical limit of balance is about 30 dB, which is to say, there remains an accidental longitudinal source. At the receiving end there is an analogous occurrence. EMI pickup tends to be in the longitudinal mode, i.e. there are equal voltages on the two conductors of a pair. The Balun or transformer at the receiving end responds to the balanced signal and cancels out the longitudinal EMI voltages, but once again the practical limit of cancellation is about 30 dB.

Another approach to solving the problem of EMI has been to provide a metallic shield around each conductor pair individually or around a plurality of pairs of twisted insulated metallic conductors. This approach is similar to the use of coaxial cable in which the outer tubular conductor performs effectively as a shield. However, there are drawbacks to the use of a shield in cable construction. The shield itself and its formation about the conductors in tubular form is expensive, increases the bulk of the cable and complicates connections. Further, it increases the attenuation of the signal to be delivered.

Still another solution has been the inclusion of a longitudinal choke in the transmission circuit. The longitudinal choke includes two windings, one for each conductor of a pair. A longitudinal choke is inductive to currents flowing in the same direction on the two conductors. Such currents are called longitudinal currents. The two windings are in parallel. If one winding is reversed, the resulting device would be a load coil. A load coil is inductive to currents flowing in opposite directions on the two conductors. Such currents are called balanced or differential currents. The inclusion of a longitudinal choke is effective to cause a substantial reduction in the longitudinal current which flows.

Longitudinal chokes have been used in cables in which the twisted pairs of insulated conductors are unshielded. The prior art also includes the use of a longitudinal choke in combination with a shielded pair. Tests have shown that the degree of EMI suppression resulting by using an unshielded pair with a choke is not as good as with a shielded pair which includes a longitudinal choke.

Notwithstanding the improvement in EMI suppression which is achieved by using a longitudinal choke with a shield, it has been desired to eliminate the use of the shield for the reasons set forth hereinbefore. That desire, seemingly, has not been satisfied by the prior art.

Seemingly, the solutions of the prior art to the problem of providing a local area network cable which can be used to transmit data bits without either radiating or picking up EMI have not yet been totally satisfying. What is needed and what is not yet available is a transmission system which includes unshielded transmission media and facilities for suppressing substantially EMI, which are compatible with balanced mode transmission equipment and which can be readily installed, fit easily into building architectures, and are safe and durable. The sought after arrangement should be one that may be used with a well known D-inside wiring which comprises a plurality of non-shielded twisted insulated conductor pairs enclosed in a plastic jacket.

SUMMARY OF THE INVENTION

The foregoing problems of the prior art have been overcome by the system of this invention. A system in accordance with this invention which is used to transmit communications signals and which is effective to combat electromagnetic interference includes facilities for generating a communications signal and facilities for receiving the generated signal. Also included in the system is an unshielded transmission medium for carrying the generated signal in a balanced mode from the generating facilities to the receiving facilities. Further, the system includes voltage divider facilities including a longitudinally extending metallic wire and facilities substantially transparent to the balanced mode and having a relatively high impedance to the longitudinal mode for decreasing substantially the longitudinal voltage on the unshielded transmission medium which carries the generated signal. By longitudinal mode is meant one half of the sum of the voltage with respect to ground on one conductor of a pair and the voltage with respect to ground that is present on the other conductor of the pair.

The longitudinally extending metallic wire may be one metallic conductor of an unused pair or it may be a drain wire. For the voltage divider, the facilities which are transparent to the balanced current may include a longitudinal choke.

Further, the system is such that the attenuation thereof is sufficient to minimize variations in the longitudinal mode input impedance to the unshielded transmission medium. For relatively long runs, the transmission medium may be sufficient to provide the attenuation needed to do this. However, for relatively short runs, the attenuation of the longitudinal mode itself may be insufficient. In those instances, it may be necessary to provide a terminating resistance at least at the receive end of the circuit or use a drain wire having a relatively high resistance.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
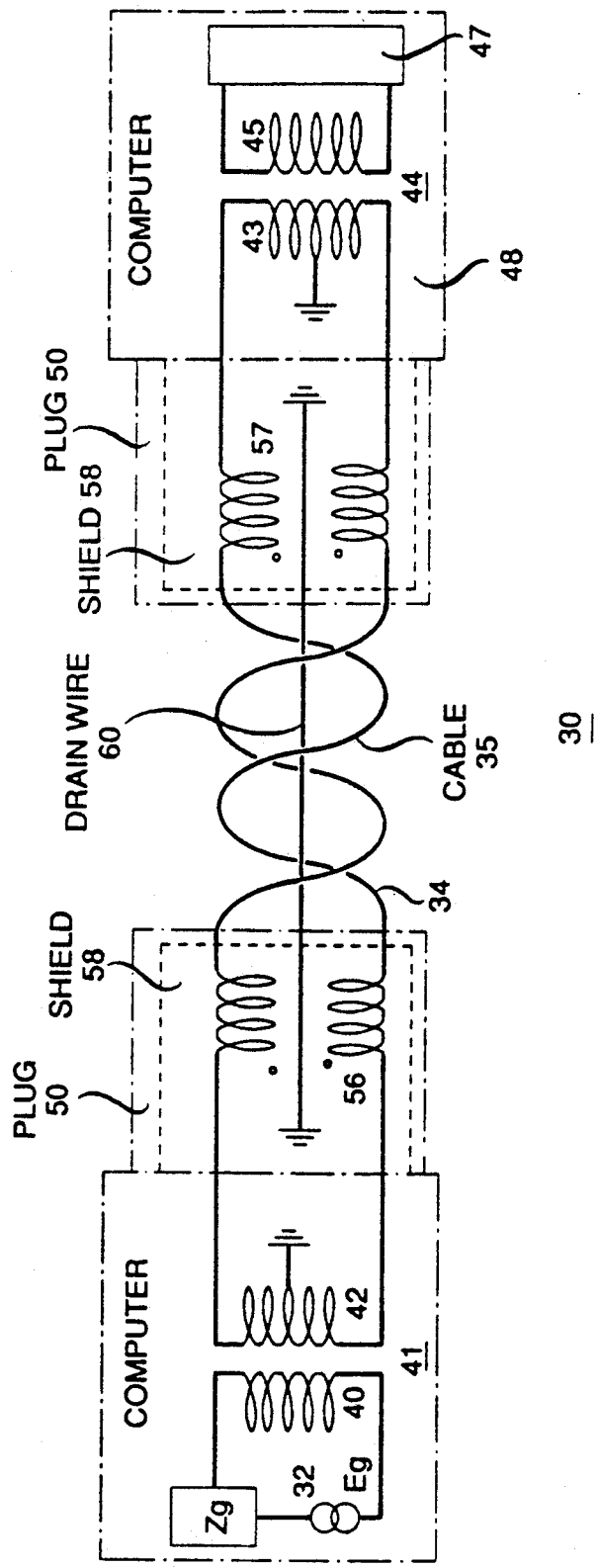
FIG. 1 is a schematic view of a transmission system of this invention.

Referring now to FIG. 1, there is shown a communications transmission system of this invention which is designated generally by the numeral 30 and which is effective to suppress electromagnetic interference (EMI). The system 30 includes a voltage source $E_g$ which is designated by the numeral 32 and which has an impedance, $Z_g$ and a cable 35.

Of importance to the design of local area network copper conductor cables are the data rate and the distances over which data signals must be transmitted. In the past, this need has been one for interconnections operating at data speeds up to 20 kilobits per second and over a distance not exceeding about 150 feet. This need has been satisfied in the prior art with single jacket cables which may comprise a plurality of insulated conductors that are connected directly between a computer, for example, and receiving means such as peripheral equipment.

In today's world, however, it becomes necessary to transmit at much higher data rates over distances which may include several hundreds of feet. Both the data rates and the distances for transmission may be affected significantly by the topology of some presently used local area network arrangements. In one, for example, each of a plurality of terminal stations is connected to a common bus configured in a ring such that signals generated at one station and destined for another must be routed into a wiring closet and seriatim out to each station intermediate the sending and receiving stations. The common bus, of course, requires a very high data rate to serve a multiplicity of stations and the ring configuration doubles the path length over which the data signals must be transmitted from each station to the wiring closet.

Even at these greatly increased distances, the transmission must be substantially error-free and at relatively high rates. Often, this need has been filled with coaxial cable comprising the well known center solid and outer tubular conductor separated by a dielectric material. The use of coaxial cables, which inherently provide unbalanced transmission, presents several problems. Coaxial connectors are expensive, bulky, and difficult to install and connect, and, unless they are well designed, installed and maintained, can be the cause of electromagnetic interference. Of course, the use of coaxial cables does not require components such as transformers at each end to provide balanced mode transmission, but the size and connectorization of coaxial cables outweigh this advantage.

A shield often is added to a twisted pair of insulated conductors to confine its electric and magnetic fields. However, as the electric and magnetic fields are confined, resistance, capacitance and inductance all change, each in such a way as to increase transmission loss. At least one company markets a cable in which each pair of conductors is provided with an aluminum foil shield and a wire braid is provided about the plurality of pairs. In order to compensate for the increased losses, the conductor insulation must be increased in thickness. As a result, the insulated conductors cannot be terminated with conventional connector hardware.

On the other hand, a cable shield surrounding all conductor pairs in a cable may be advantageous. Consider that the pairs may be inside a cabinet and may be exposed to high speed digital signals. Stray radiation (EMI) will be picked up in the longitudinal mode of the twisted pairs. If the pairs are then routed outside the cabinet, they may radiate excessively. If there is a cable shield enclosing the plurality of pairs, the shield may be grounded at the cabinet wall so that the shield will not itself carry stray signals to the outside environment. Thus, a shield disposed about all the pairs in a cable can be effective in preventing electromagnetic interference. However, as mentioned hereinbefore, shielding is expensive, difficult to form into the cable, increases the cable size and makes connections more difficult.

Figure 2:
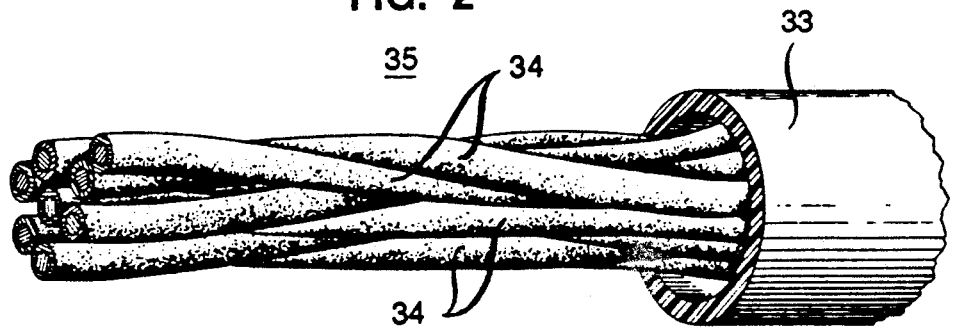
FIG. 2 is a perspective view of a cable of this invention for providing substantially error-free data transmission.

Referring now to FIG. 2, it is seen that the data transmission cable 35 of this invention does not include a shield. As can be seen in FIG. 2, the cable 35 includes at least one twisted pair of insulated conductors 34—34. Each insulated conductor 34 includes a metallic conductor enclosed in plastic insulation. The conductors are enclosed in a plastic jacket 33.

Figure 3:
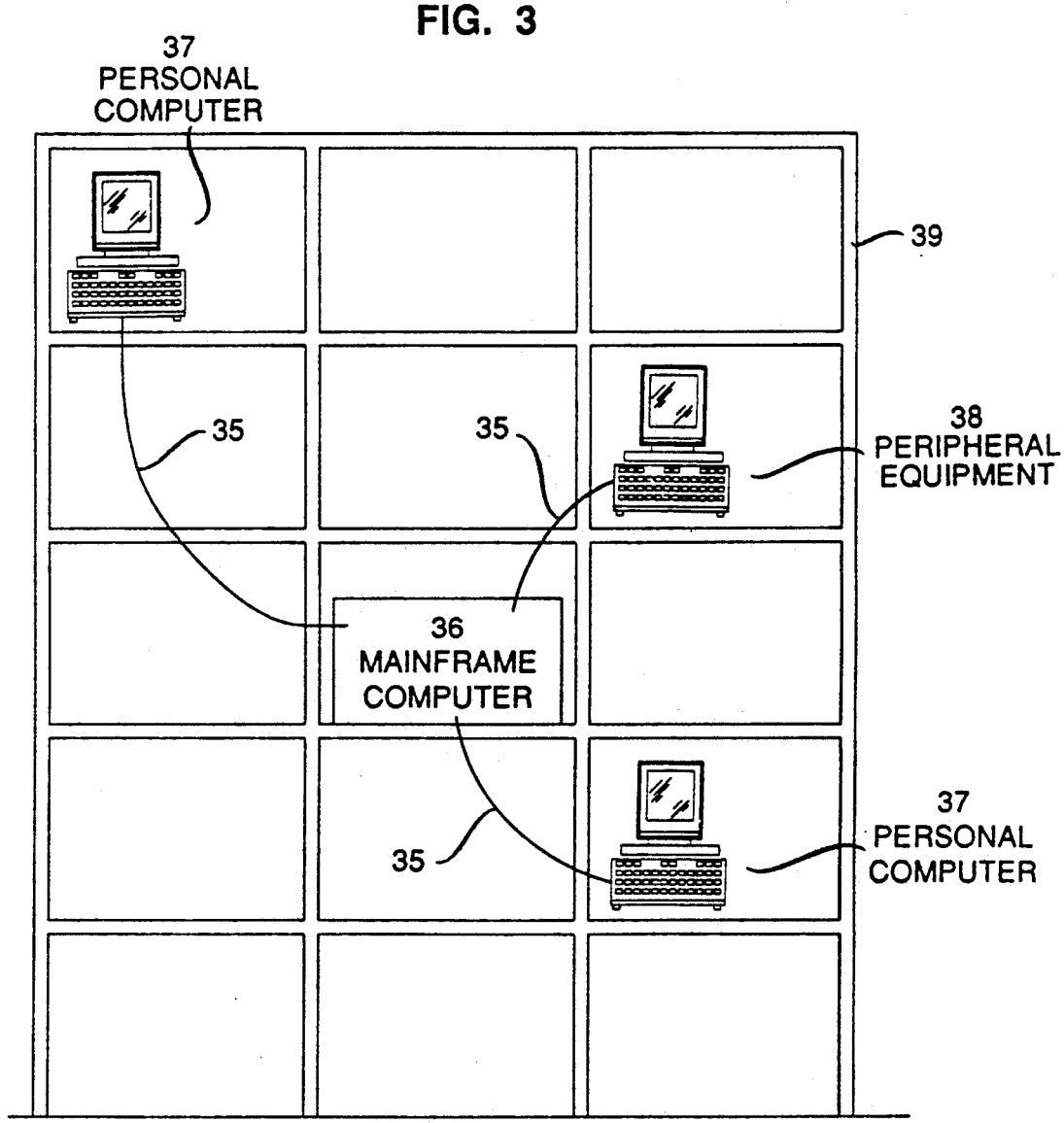
FIG. 3 is an elevational view of a building to show a mainframe computer and printers linked by a transmission system of this invention.

Typically, the cable 35 may be used to network one or more mainframe computers 36 (see FIG. 3), many personal computers 37—37, and peripheral equipment 38 on the same or different floors of a building 39. The peripheral equipment 38 may include a high speed printer, for example. Desirably, the interconnection system minimizes interference on the system in order to provide substantially error-free transmission.

The cable 35 of this invention is directed to providing substantially error-free data transmission in a balanced mode. As will be recalled, in a balanced mode transmission system, voltages and conductors of a pair are equal in amplitude but opposite in polarity. This of course, requires the use of components, such as transformers, for example, at end points of the cable. Among the advantages of a balanced system is less crosstalk and less EMI.

A balanced mode transmission system which includes a plurality of pairs of the individually insulated conductors 34—34 is shown in FIG. 1. Each pair of conductors 34—34 is connected from a digital signal source through a primary winding 40 of a transformer 41 to a secondary winding 42 which may be center-tap grounded. The conductors are connected to a winding 43 of a transformer 44 at the receiving end which also may be center-tap grounded. A winding 45 of the transformer 44 is connected to a receiver 47 of a computer 48. With regard to outside interference, whether it be from power induction or other radiated fields, the electric currents cancel out at the output end. If, for example, the system should experience an electromagnetic interference spike, both conductors will be affected equally, resulting in a null, with no change in the received signal. For unbalanced transmission, a shield may divert these currents but will not cancel them.

In the past, computer equipment manufacturers have been somewhat reluctant to use balanced mode transmission, primarily because of costs. For unbalanced mode transmission, it is unnecessary to connect additional components such as transformers into circuit boards at the ends of each conductor pair. Use in an unbalanced mode avoids the need for additional terminus equipment and renders the cable 35 compatible with present equipment. However, because balanced mode transmission increases the distances and/or bit rates over which twisted pair cable can transmit data signals substantially error-free, there has been an increasing willingness to invest in the additional components at the ends of the cable.

Further, there is a requirement that the outer diameter of the cable 35 not exceed a predetermined value and that the flexibility of the cable be such that it can be installed easily. The cable 35 has a relatively small outer diameter and is both rugged and flexible thereby overcoming the many problems encountered when using a cable having a shield.

As can be seen in FIG. 1, computers are connected together by the cable 35 having transformer facilities at each end thereof. The cable 35 is connected into each computer by a plug 50. Each plug includes a housing in which is disposed a shield 58. As shown in FIG. 1, the cable 35 connects into the transmitting computer through a plug 50 and into a the receiver 47 of the computer 48 such as one of the computers 37 or 38 shown in FIG. 3 through a shield 58 of a plug 50.

In order to suppress electromagnetic interference of the cable 35, the system 30 includes voltage dividing facilities. As is seen in FIG. 1, each side, tip and ring, of the cable 35 is provided with an inductance at the transmitting end of the cable. More specifically, the tip side and the ring side of the cable 35 in the plug 50 at the transmitting end are provided with a longitudinal choke 56. The choke 56 is enclosed with the shield 58.

In a preferred embodiment, the receiving end of the cable 35 also is provided with a longitudinal choke, one designated 57, which is associated with the tip side and with the ring side. As should be realized, the strength of the signals along the cable 35 decreases with distance. However, because of possible extraneous emission from the receiver 47, it is believed that the use of the longitudinal choke 57 at the receiving computer also is warranted. Extraneous emissions may occur at the receiving end because of clock signals from the receiving equipment coupling to the twisted pair of insulated conductors in the longitudinal mode. A second reason for the inclusion of the longitudinal choke 57 at the receiving end is that the conductor pair may not be perfect. Although a signal may be balanced at the transmit end, it could become partially unbalanced as it moves along a conductor pair. Thirdly, although it is commonplace to use one conductor pair to transmit and another to receive, there are some systems available commercially in which the same conductor pair is used to transmit and to receive. In such an arrangement, it becomes necessary to include longitudinal chokes at each end of each pair.

Further as part of the voltage dividing facilities, the system 30 of this invention includes a longitudinally extending metallic conductor 60. As is seen in FIG. 1, the longitudinally extending metallic conductor 60 is grounded at the transmitting end and also at the receiving end. The longitudinally extending conductor 60 may be a drain wire, for example, or the longitudinally extending conductor may be one of the conductors of an unused twisted pair. Of course, it should be realized that the grounding of unused conductors is not new. What is new is the combination of a longitudinally extending metallic conductor and a longitudinal choke at the end of a transmission line comprising at least one unshielded pair and one other conductor.

On the receive end, any currents resulting from EMI will be longitudinal currents and will be canceled in the receive transformer. However, as stated above, the degree of cancellation is only about 30 dB. With the arrangement of this invention, advantageously there is high impedance to the longitudinal mode. The high impedance of the longitudinal mode additionally reduces the amount of longitudinal current. However, there is transparency to the desired balanced signal. The balanced mode loss due to the longitudinal choke is about 0.5 dB or less.

Figure 4:
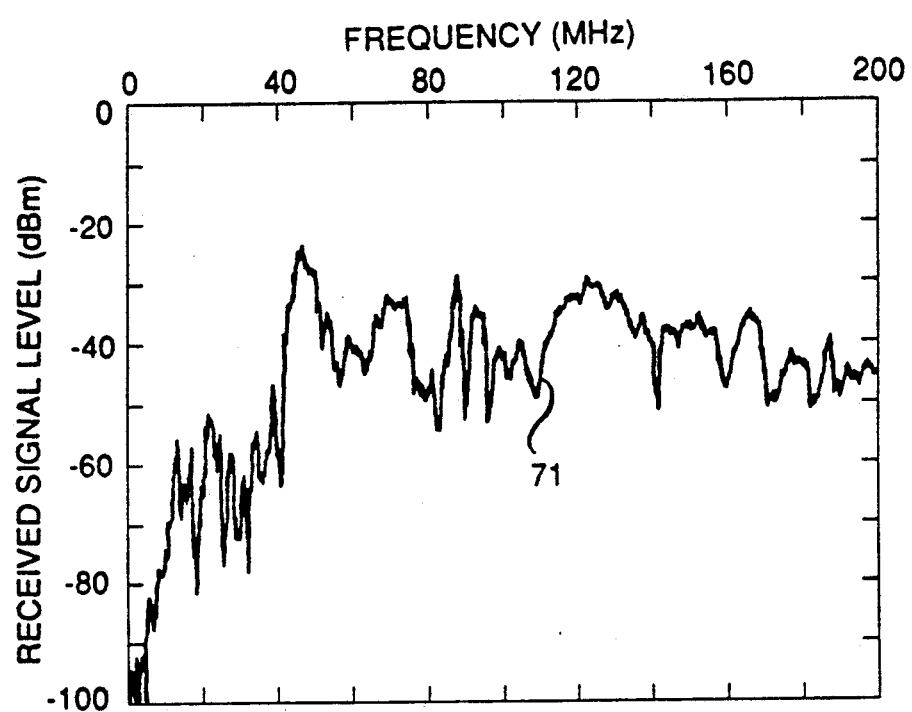
FIGS. 4-7 are plots for various prior art cable constructions of radiated EMI versus frequency when a twisted pair is driven in the longitudinal mode.
Figure 5:
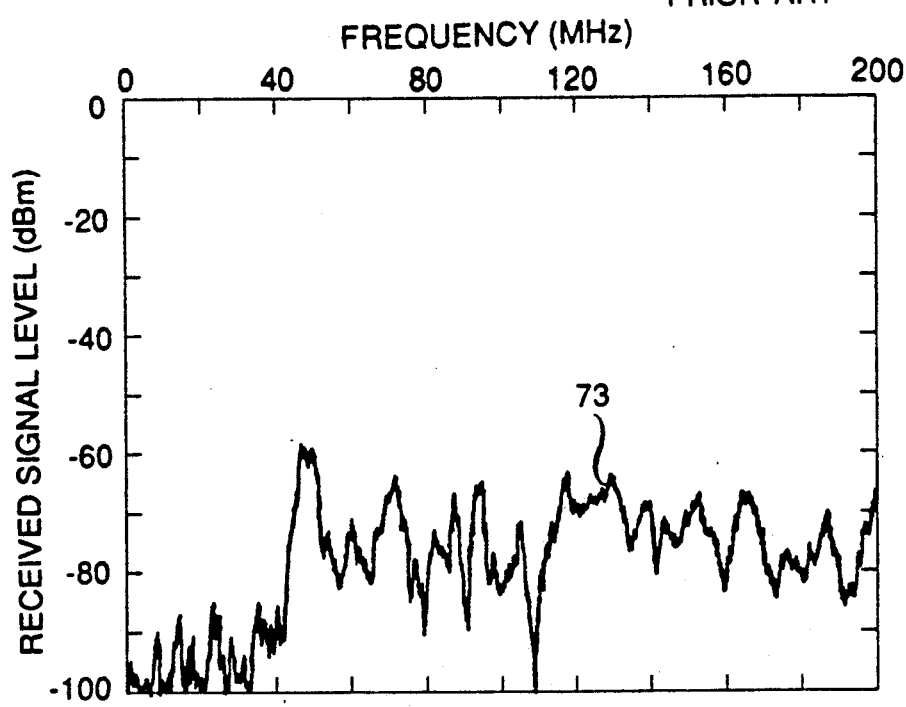

The effect of the combination of a metallic wire and a longitudinal choke or chokes may be seen by viewing and comparing the graphs of FIGS. 4 and 5. All EMI measurements which are presented in FIGS. 4 and 5 and hereinafter in graph form were made in the same rooms using the same signal source, pickup antenna and receiver. The cables measured and the pickup antenna were in one room. The pickup antenna used was a biconical antenna made by A. H. Systems, Inc. The signal source and receiver were in an adjacent room and were embodied in a 3577A network analyzer manufactured by Hewlett Packard.

For the tests which provided the data in the graphs herein, the driving signal level was 1.00 mW into a conductor pair characterized by a 50 ohm load. The pair was driven in the longitudinal mode, the tip and ring of the pair being shorted together and connected to the center conductor of a coaxial cable connected to the network analyzer. The outer conductor of that coaxial cable was variously connected to the shield of the cable being measured, to a drain wire or to a conductor of an unused pair, or it was left open.

The cables measured were loosely draped over a horizontal support three feet high, with loops of the cable nearly touching the floor. The biconical antenna was located three meters from the cables measured. The rooms were shielded from outside radiation but neither room was treated to be anechoic. Measurements made with the foregoing arrangement were periodically compared to measurements made in an anechoic chamber and were found to be similar.

Shown in FIG. 4 by a curve 71 is the EMI over a frequency range for an 80 foot shielded twisted conductor pair cable with one pair of a plurality driven longitudinally and all others floating and a drain wire connected to ground. Nine inches of the shield were removed at the midpoint of the cable to simulate a convenient system to access the pairs. When the other pairs, three in number, which were unused were also grounded, there was little change. In FIG. 5, a curve 73 represents the cable of FIG. 4 but with the addition of a longitudinal choke at the driving end. The arrangement in FIG. 5 permits transmission of digital signals at least to 100 Mbps while meeting current EMI standards.

Figure 6:
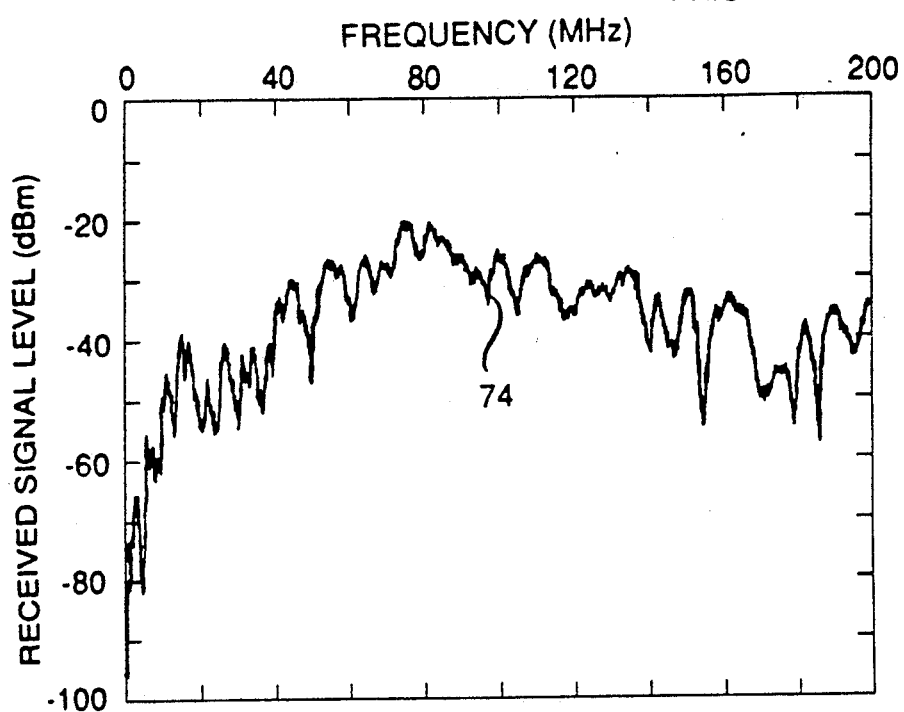
Figure 7:
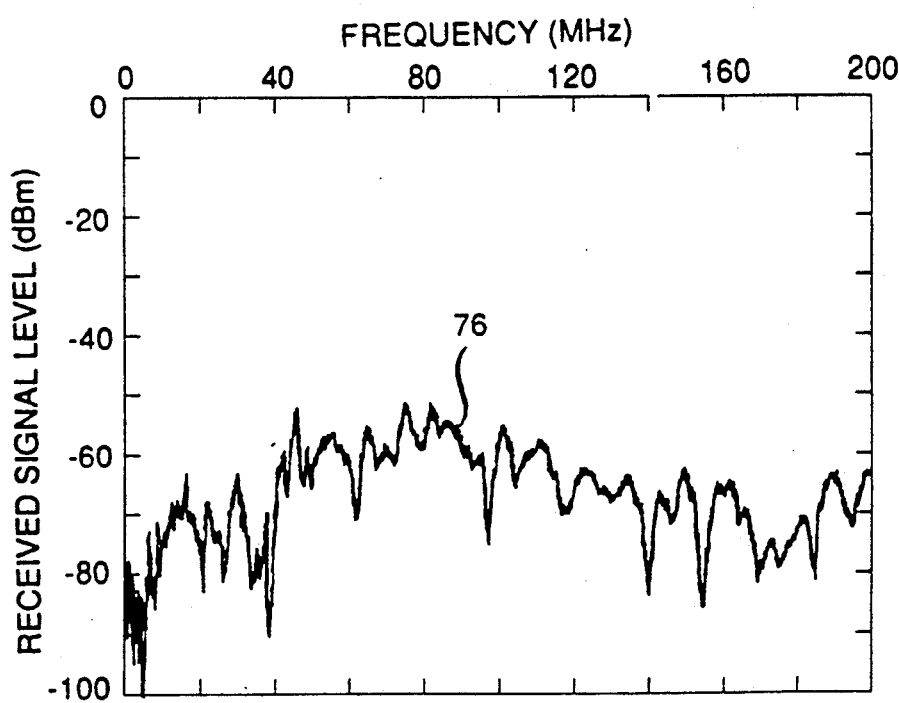
Figure 8:
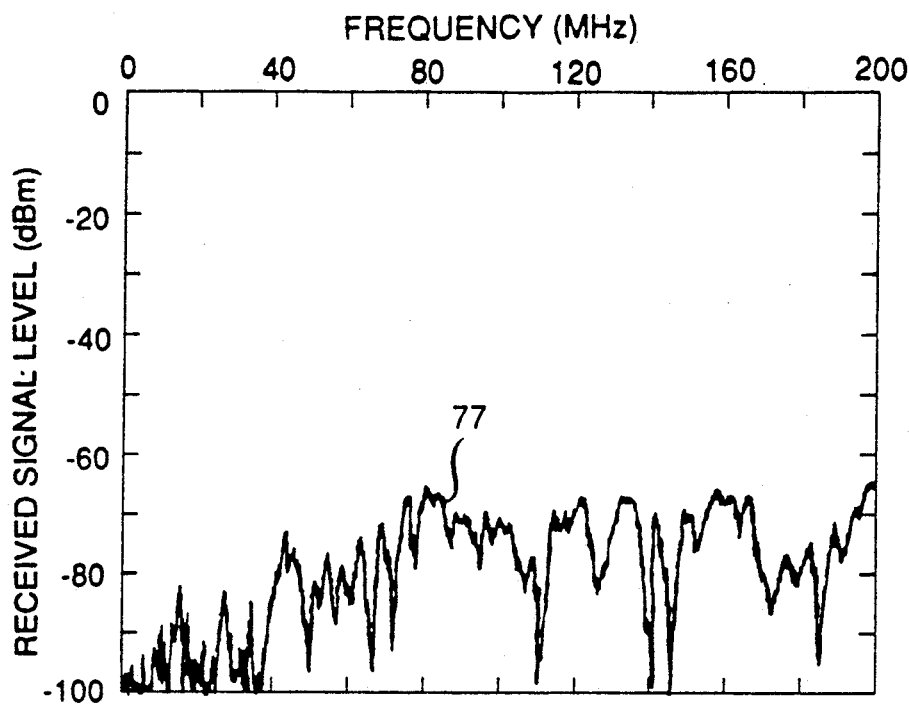
FIG. 8 is a plot of radiated EMI versus frequency of a cable of this invention when a twisted pair thereof is driven in the longitudinal mode.

A single drain wire in the midst of a bundle of pairs of insulated metallic twisted conductors has been found to be as effective as a shield with respect to EMI, that is, it lowers the impedance as may be seen by viewing and comparing the graphs of FIGS. 6, 7 and 8. Going now to FIG. 6, there is shown a curve 74 which represents the EMI over a frequency range for an 80 foot unshielded prior art DIW cable with one pair driven longitudinally and all other pairs floating. A typical DIW cable includes a plurality of twisted pairs of insulated conductors enclosed in a plastic jacket. A system with a grounded conductor provides little, e.g. about 5 dB, improvement in EMI relative to that of the 80 foot DIW cable. Curve 76 of FIG. 7 represents the cable of the curve 74 of FIG. 6 but with the addition of a longitudinal choke at the driving end. The EMI is reduced but the results were not as good as curve 73 of FIG. 5. Curve 77 of FIG. 8 represents cable of this invention which includes the cable of curve 76 of FIG. 7 but with one other conductor grounded at both ends. The EMI was at least as good as that of curve 73 of FIG. 5, an arrangement with shielded cable that provides excellent EMI performance.

As can be appreciated from the foregoing curves, a shield has an effect, known but not appreciated, that is, it decreases the longitudinal impedance of a twisted pair. As will be shown hereinafter, a lower longitudinal impedance means that the voltage divider arrangement of the present invention is more effective. By decreasing the longitudinal impedance, the drain wire 60 enhances the effectiveness of the longitudinal choke. The cable of the present invention achieves a low longitudinal impedance without the use of a shield.

As mentioned hereinbefore, the prior art has included the use of longitudinal chokes to suppress incoming or outgoing radiation on twisted pairs. But what the prior art seemingly lacks is the combination of a longitudinal choke and a drain wire in an unshielded cable to enhance the voltage divider action of the choke.

The effect of the choke may be appreciated by considering a few elementary circuits. Viewing now FIG. 9, there is shown a reference circuit which is designated by the numeral 80. The longitudinal voltage, $V_t$ is given by the equation $$V_t = \frac{Z_t}{Z_g + Z_t} E_g.$$

where $Z_t$ and $Z_g$ represent terminating and generating impedances, respectively, and $E_g$ represents the voltage of a source. For the circuit of FIG. 9, assuming that $Z_g$ and $Z_t$ each has a value of 50 ohms, $V_t = \frac{1}{2}E_g$.

Figure 10:
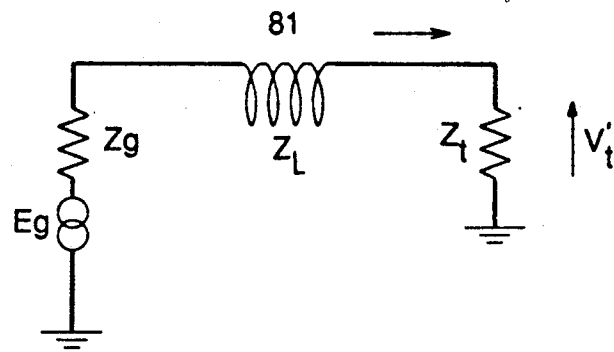

With the presence of a longitudinal choke 81 as shown in FIG. 10, the divisor is increased by the term $Z_L$ being the impedance of the choke. Hence, the inclusion of a longitudinal choke is effective to cause a substantial reduction in the longitudinal voltage, $V'_t$ which is given by the equation $$V'_t = \frac{Z_t}{Z_g + Z_t + Z_L} E_g$$

The longitudinal choke is shielded (see FIG. 1) and acts to decrease the longitudinial voltage before reaching the unshielded cable pair. It should be clear that the choke will be more effective if $Z_t$ can be made uniformly small.

Figure 9:
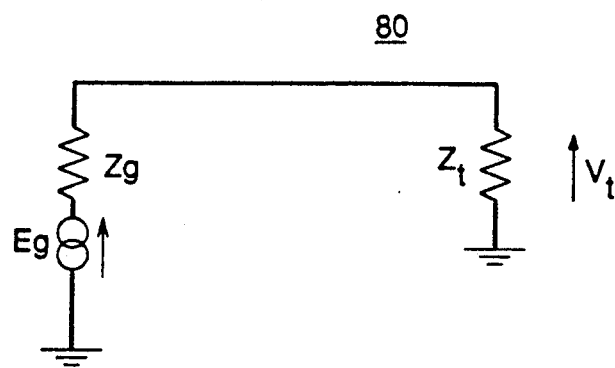
FIGS. 9 and 10 are referred to in the detailed description to explain the operation of a voltage divider circuit.
Figure 11:
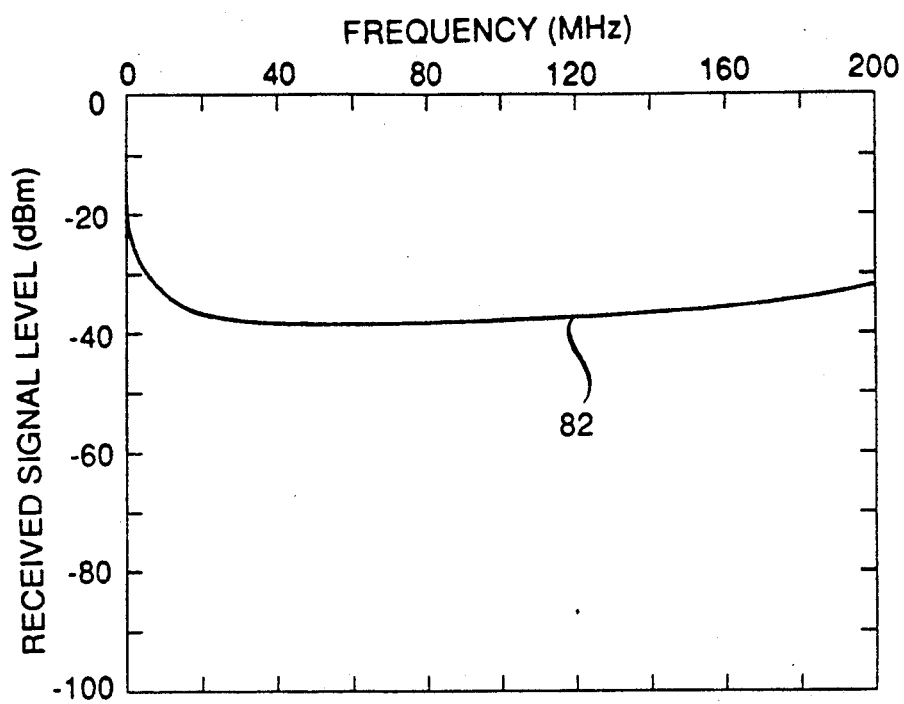
FIG. 11 is a graph which depicts attenuation versus frequency.

Referring now to FIG. 11, there is shown a trace 82 which depicts insertion loss which has been achieved by the addition to the circuit of FIG. 9 of a longitudinal choke as shown in FIG. 10, and the effect of its mountings in a shielded enclosure. The trace 82 shows that the response at the termination is reduced by about 34 dB from 10 to 200 MHz, which means that $V'_t/V_t = 0.02$. Assuming values of $Z_g = 50$ ohms and $Z_t = 50$ ohms, the foregoing equation for $V'_t$ may be solved to yield a $Z_L$ value of 4900 ohms.

Figure 12:
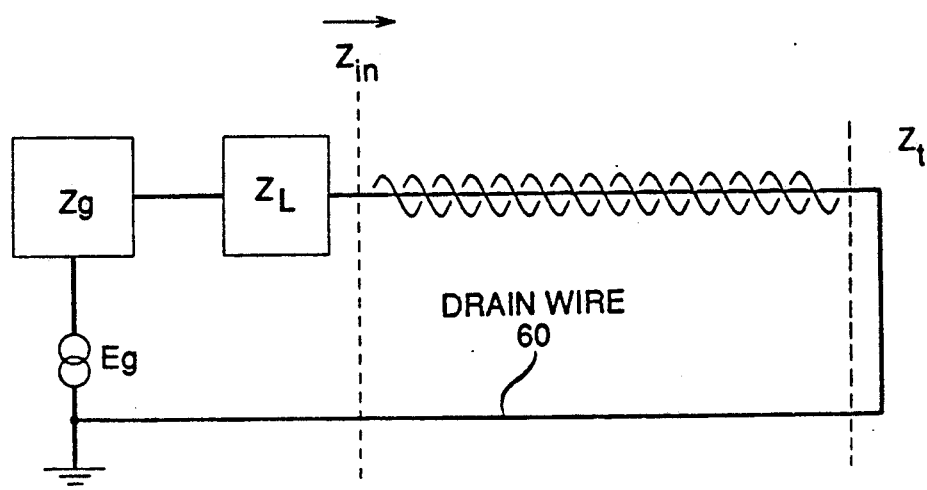
FIG. 12 is a schematic view of a circuit which includes a cable of this invention comprising unshielded transmission means and a drain wire.

Desirably, the system of this invention should be operable for a wide range of frequencies and for any cable length. For relatively short cable lengths, it may be desirable to specify a termination of the drain wire. Going now to FIG. 12, which depicts a cable of this invention the longitudinal input impedance $Z_{in}$ becomes the terminating impedance $Z_t$ of FIG. 10. This impedance may vary wildly with frequency. For instance, if the plug shield and/or the drain wire 60 are grounded, the longitudinal circuit is effectively shorted at the receiving end. The input impedance for an odd number of one-quarter wave lengths may be very large. For instance, for a quarter wavelength, $\lambda/4$, the input impedance, $Z_{in}$, is given approximately by the expression $$Z_{in} = \frac{Z_o}{2\alpha L}$$

where $Z_o$ is the characteristic impedance of the longitudinal circuit, where $\alpha$ is the longitudinal attenuation per unit distance, L is the length of the twisted pair and where $Z_{in}$ is the terminating impedance for the simple circuit at the left hand portion of FIG. 12. Of concern is the third harmonic of the commonly used 16 MHz frequency which is 48 MHz. Assuming that $Z_o$ has a value of 50 ohms and that $\alpha$ is approximately equal to the product of 6 and the square root of frequency (i.e. $f^{\frac{1}{2}}$) in dB/kft., then for f=48, $\alpha$ is about equal to 42 dB/kft.

At a frequency of 48 MHz, $\lambda$ is approximately equal to 16 feet and a quarter wavelength is four feet. With $\alpha \approx 42$ dB/kft. and L at four feet, $\alpha = 0.004 \times 42 = 0.16$ dB/4 feet $\approx 0.02$ nepers/4 feet. As a result, the terminating impedance $Z_t$ which becomes the input impedance $Z_{in}$ for the transmission line becomes equal to $50/(2 \times 0.02) = 1250$ ohms. What is sought after is a value of $Z_L$ which is very large compared to $Z_t$. However, if $Z_t$ becomes excessively large, $Z_L$ will have an insignificant impact on the outcome. Further, it would appear somewhat difficult to build an inductor which is large in value compared to 1250 ohms, and yet the four foot length for which this condition occurs is not an outlandishly small length for the environment of use of the system of this invention.

Figure 13:
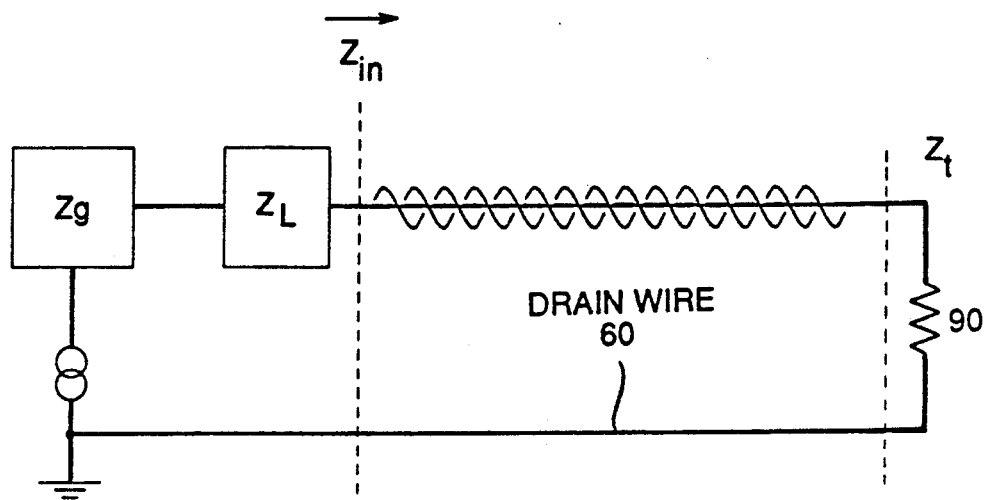
FIG. 13 is a schematic view of a circuit which includes a cable of this invention comprising unshielded transmission means, a drain wire and termination means for the drain wire.

The input impedance of the longitudinal circuit can be controlled by terminating with a resistor 90 as shown in FIG. 13. It should be noted that FIG. 13 is identical to FIG. 12 but with the addition of the resistor which preferably is 50 ohms. If the resistor matches the longitudinal characteristic impedance, the input impedance will be identical to the longitudinal characteristic impedance for any frequency and for any cable length.

It will be recalled that $Z_{in}$ is the input impedance to a longitudinal current with a drain wire. If L, the length of the transmission line becomes three times as large, for example, the range of variation of $Z_{in}$ will be one third as great. It should be apparent from the foregoing discussion that the need for a resistor disappears at longer lengths. For instance, if the line length is 80 feet, then $Z_{in}$ of the unterminated line is equal to the quotient of 50 and 0.8. Hence, as the transmission line becomes longer, the criticality of terminating the drain wire becomes less and less.

There is thought that a resistor also may be needed at the transmit end. This may be so because the impedance at the transmit end with computers is an unknown; the true longitudinal source is an accidental source.

Figure 14:
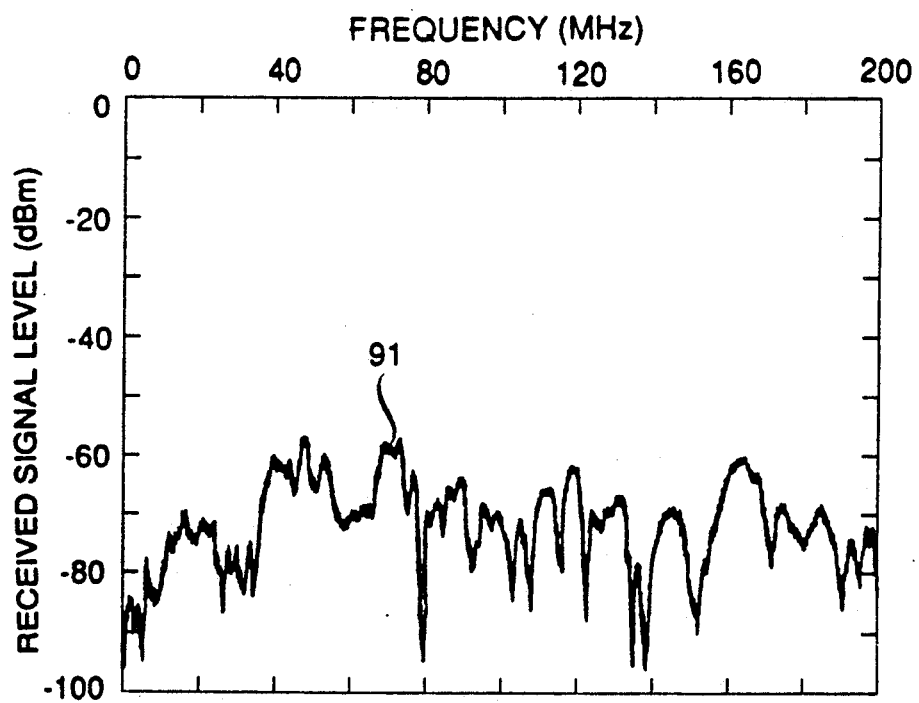
FIG. 14 is a plot for a cable of this invention of radiated EMI versus frequency when a twisted pair of the cable is driven in the longitudinal mode.
Figure 15:
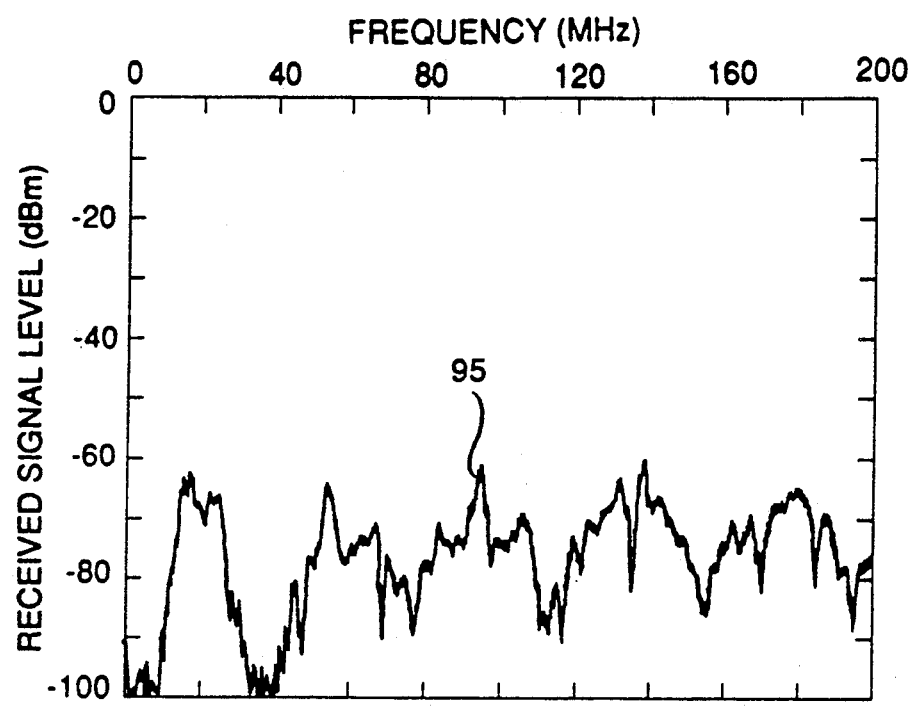
FIGS. 15-16 are plots for cables of this invention of radiated EMI versus frequency when a twisted pair of the cable is driven in the longitudinal mode.
Figure 16:
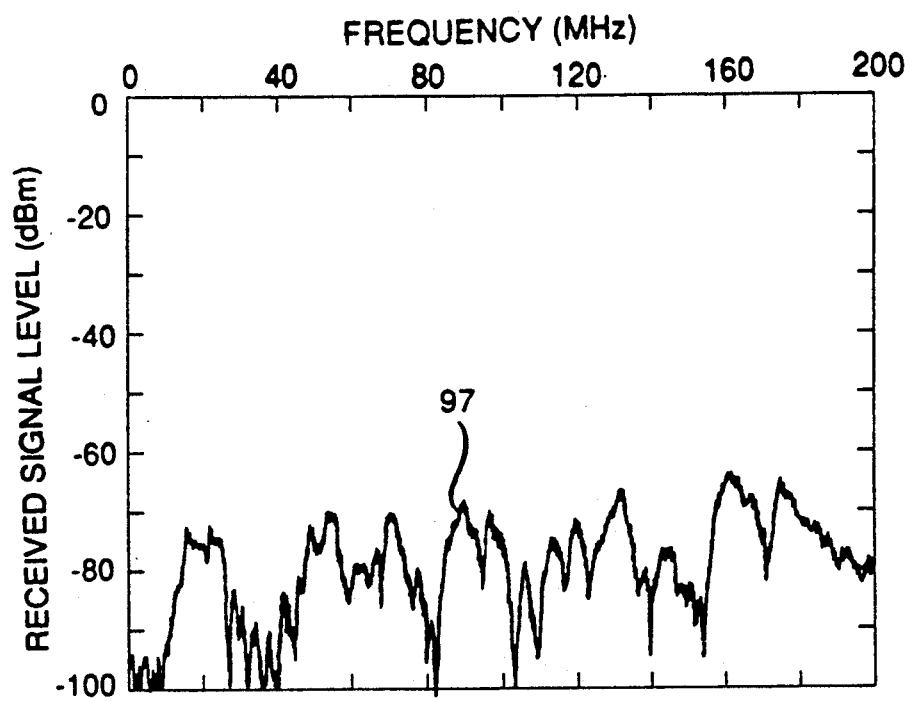

Tests have been run to determine the effectiveness of a resistor at the receive end of a relatively short length of cable. Shown in FIG. 14 by a curve 91 is the EMI over the frequency range for an eight foot length DIW cable of this invention which includes a longitudinal choke. For an eight foot length of DIW cable which includes a choke with one end of the cable grounded and the far end thereof left open, the response is substantially that shown in FIG. 14. Shown in FIG. 15 by a curve 95 is the EMI over the frequency range for an eight foot length of DIW cable which includes a longitudinal choke with one conductor grounded at both ends. Lastly, a curve 97 in FIG. 16 depicts the EMI over the frequency range for an eight foot length of DIW cable with the near end grounded and a 50 $\Omega$ resistor to ground at the far end. As can be seen, the EMI, particularly the peaks thereof, is reduced with the inclusion of the 50 $\Omega$ resistor.

What is important to recognize is that the transmission line itself may have suitable longitudinal attenuation to limit the variations in input impedance. Once past a critical length, there is sufficient longitudinal attenuation in a copper conductor line itself so that a terminating resistor is not needed. That longitudinal attenuation is such that it is sufficient to limit the variations in input impedance. In other words, the attenuation of the longitudinal mode will be itself sufficient if the transmission line is long enough. For relatively short runs, suppression is enhanced by terminating the longitudinal mode with a resistor. Also, it is possible to use a conductor wire made of steel or nichrome metal instead of copper. Each of these metals has a unit resistance much greater than copper and, in addition, steel may introduce useful magnetic permeability. As a result, even a relatively short run of such a conductor may reduce the longitudinal impedance sufficiently to limit variations in input impedance.

Figure 17:
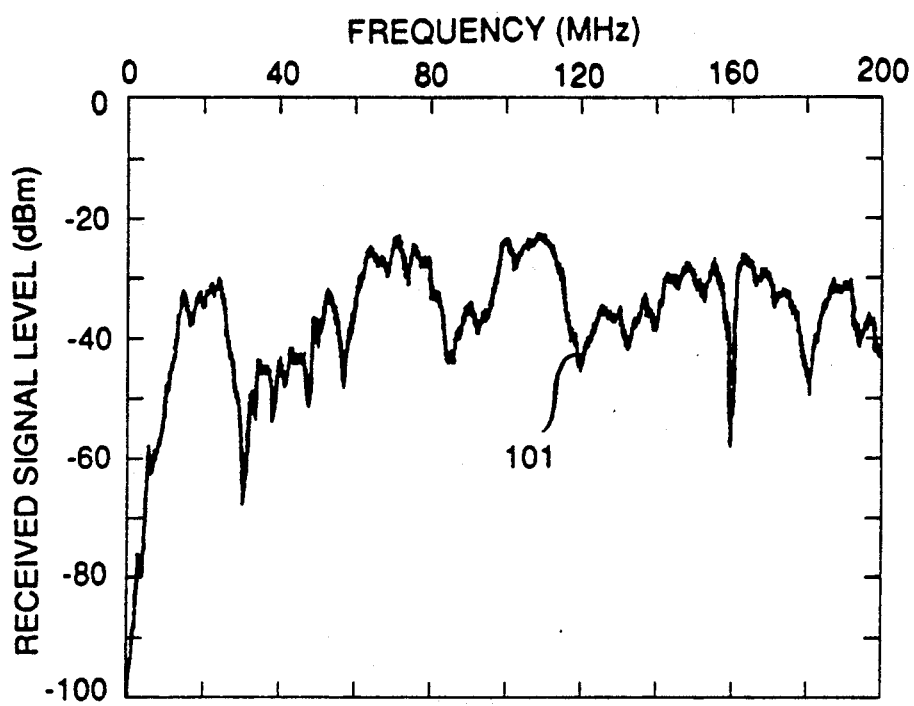
FIGS. 17 and 18 are plots for relatively short lengths of prior art cables of radiated EMI versus frequency.
Figure 18:
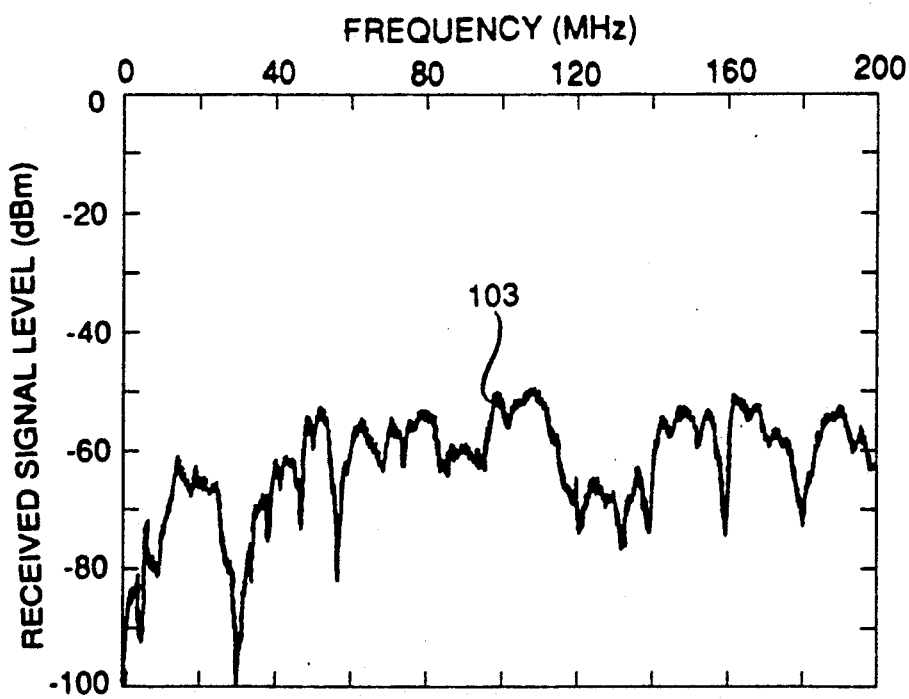
Figure 19:
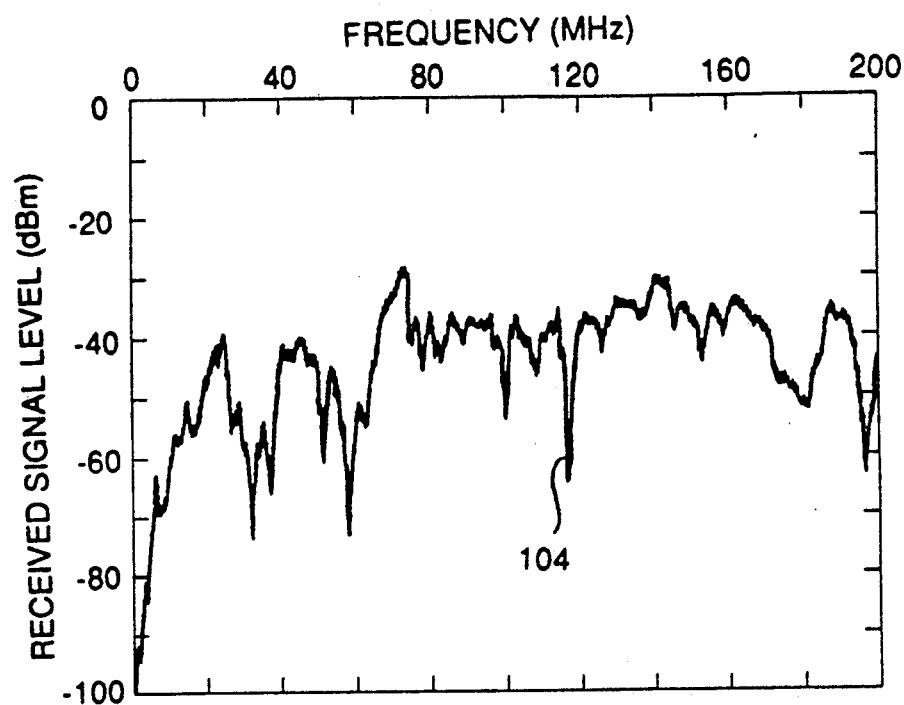
FIG. 19 is a plot of radiated EMI versus frequency for a cable in which a grounded steel drain wire has been added to a cable for which a plot of radiated EMI versus frequency is shown in FIG. 17.
Figure 20:
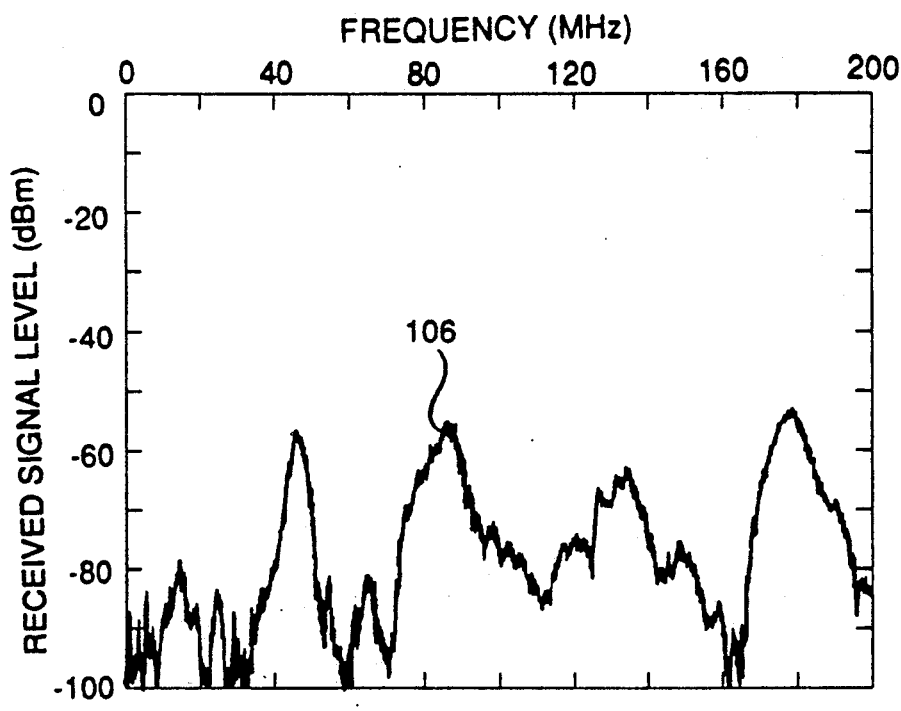
FIGS. 20-22 are plots for cables of this invention each of which includes a relatively short length of cable of radiated EMI versus frequency.
Figure 21:
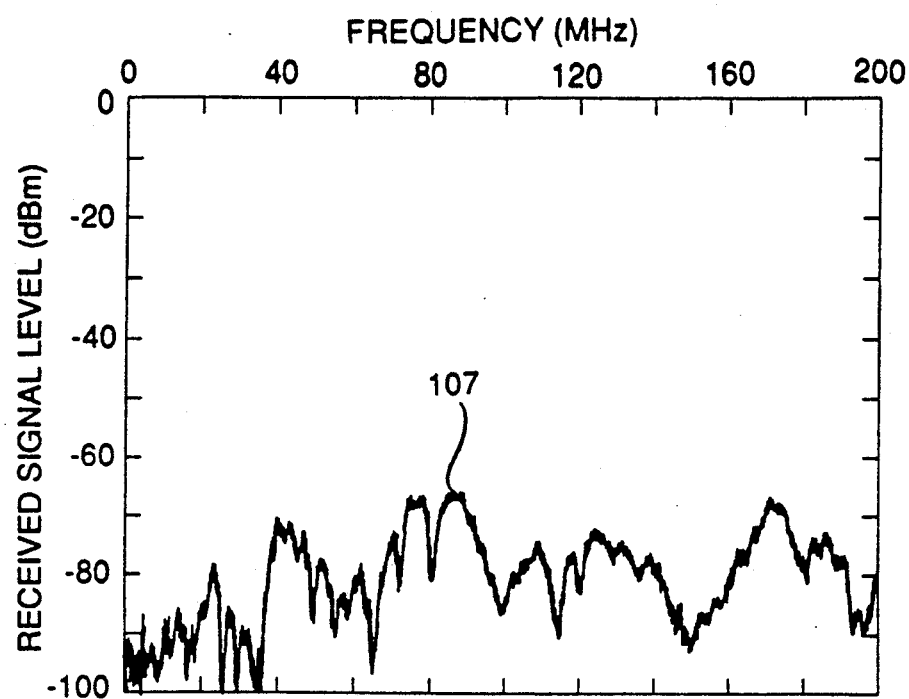
Figure 22:
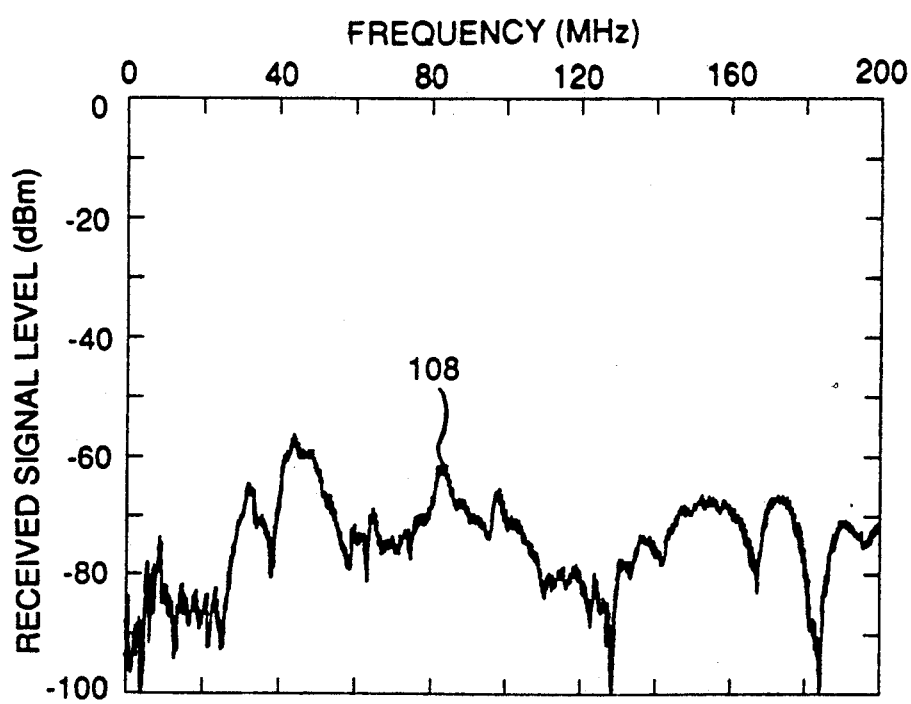

Going now to FIG. 17, there is shown a graph which depicts a curve 101 representing EMI over the frequency range for an eight foot length of prior art distributing frame wire (DFW) having a tightly twisted conductor pair. With no choke and no drain wire, the graph appears as shown in FIG. 17 with strong EMI. FIGS. 18-19 show curves 103 and 104 representing the EMI for an eight foot length of DFW having a choke but no drain wire and with no choke and a grounded drain wire comprised of steel, respectively. FIG. 18 shows the prior art advantage of adding a choke when there is no drain wire. FIG. 19 shows that adding a grounded steel drain wire reduces EMI somewhat from that in FIG. 17. In FIG. 20, a cable of this invention includes the eight foot length of wire includes a choke and a grounded copper drain wire. A curve 106 in FIG. 20 shows that EMI is reduced somewhat from that in FIG. 18 but exhibits strong peaks, indicating longitudinal mode reflections. In FIG. 21, the wire of the system of this invention is provided with a choke and a grounded steel drain wire. The result as shown by a curve 107 is lower EMI than what shows in any of the previous figures, i.e. FIGS. 17-20, and substantial smoothing out of reflections in FIG. 20. Lastly, FIG. 22 depicts a curve 108 which represents the EMI for an eight foot length of cable of this invention which includes a tight twist DFW with a choke and a grounded steel drain wire connected to twenty-two feet of an unshielded twisted pair not having a drain wire or choke.

Figure 23:
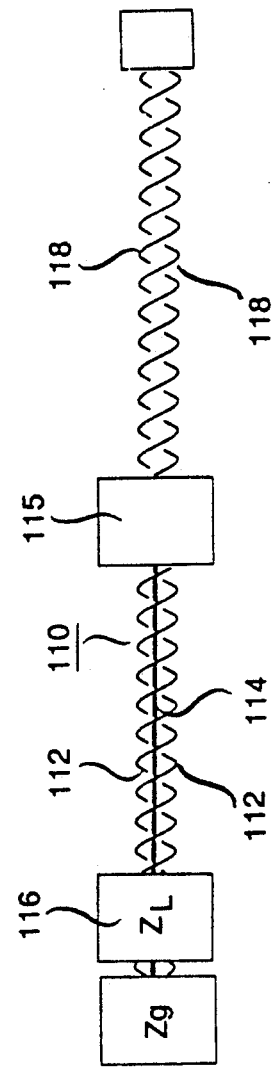
FIG. 23 is a schematic view of a hybrid cable comprising a relatively short length of a cable including a choke and a longitudinal drain wire connected to a relatively long length of an unshielded twisted pair.

As can be seen, the EMI resistance of the last mentioned arrangement while not quite as good as the arrangement in FIG. 21, results in quite a reduction of the peaks from the curve in FIG. 17. In view of this, inasmuch as desk top computers generally are shipped with an eight foot length of cord having a ground wire, the cord could be modified to include a longitudinal choke. The eight foot cord is connected to the computer and in the field to a length of an unshielded twisted conductor pair. This arrangment of this invention is depicted in FIG. 23 which includes an eight foot cord 110, for example, which includes a twisted pair of conductors 112-112 and a steel drain wire 114. The cord 110 also includes a longitudinal choke 116 adjacent to an input end of the cord. Connected to the output end of the cord 110 at a wall outlet 115, for example, is a length of unshielded twisted pair of conductors 118—118 with no associated drain wire.

It may be advisable in the cord 110 to include means for further reducing the longitudinal impedance. This may be accomplished with a second drain wire or a braided steel shield, for example.

It is to be understood that the above-described arrangements are simply illustrative of the invention. Other arrangements may be devised by those skilled in the art which will embody the principles of the invention and fall within the spirit and scope thereof.

We claim:

1. A communications system for transmitting communication signals and including means for suppressing electromagnetic interference, said system comprising:
   means for generating a communications signal;
   means for receiving the generated signal;
   unshielded means for carrying the generated signal in a balanced mode from said means for generating a signal to said means for receiving the generated signal; and
   voltage divider means coupled to said unshielded means and including a longitudinally extending metallic conductor and means which is substantially transparent to the balanced mode and which has a relatively high impedance to a longitudinal mode of the generated signal for decreasing substantially a longitudinal voltage of the generated signal on said unshielded means for carrying the generated signal.

2. The system of claim 1, wherein said longitudinally extending metallic conductor comprises a drain wire.

3. The system of claim 1, wherein said unshielded means comprises a plurality of pairs of insulated metallic conductors including at least one pair of conductors used to carry the generated signal and said longitudinally extending metallic conductor comprises at least one conductor of at least one unused pair of said unshielded means.

4. The system of claim 1, wherein said means substantially transparent to the balanced mode comprises a longitudinal choke which is connected in series with said unshielded means.

5. The system of claim 1, wherein said unshielded means includes a plurality of twisted pairs of insulated metallic conductors and a longitudinal choke is associated with each said pair for which protection against longitudinal crosstalk is required.

6. The system of claim 5, wherein said choke of each pair is disposed adjacent to said means for generating a communications signal.

7. The system of claim 6, wherein each pair also is provided with said longitudinal choke disposed adjacent to said means for receiving the generated signal.

8. The system of claim 1, wherein said system also includes means coupled by an electromagnetic field to said unshielded means for providing attenuation which is sufficient to limit variations in input impedance of the longitudinal mode of said unshielded means.

9. The system of claim 8, wherein said means coupled by an electromagnetic field to said unshielded means is sufficiently adjacent to said unshielded means to reduce a longitudinal characteristic impedance of said unshielded means adjacent to said substantially transparent means.

10. The system of claim 9, wherein said means for providing attenuation comprises said unshielded means for carrying the generated signal which is sufficiently long to provide sufficient attenuation to minimize variations in input impedance of the longitudinal mode to said unshielded means.

11. The system of claim 9, wherein said means for providing attenuation comprises said unshielded means for carrying the generated signal, said unshielded means for carrying the generated signal including a conductor which is made of a metal characterized by a unit resistance which is substantially higher than that of copper.

12. The system of claim 11, wherein said unshielded means for carrying the generated signal comprises a conductor which has a useful magnetic permeability.

13. The system of claim 9, wherein said means coupled to said unshielded means comprises a resistor in series with said longitudinally extending metallic conductor, adjacent to said means for receiving the generated signal.

14. The system of claim 13, wherein said means coupled to said unshielded means further includes a resistor adjacent to said means for generating a communications signal.

15. A cable for transmitting communication signals and including means for suppressing electromagnetic interference, said cable comprising:
   unshielded means for carrying signals in a balanced mode; and
   longitudinally extending metallic means connected to said unshielded means and adapted to cooperate with means which is substantially transparent to the balanced mode and which has a relatively high impedance to a longitudinal mode of said signals for reducing a longitudinal impedance of said unshielded means.

16. The cable of claim 15, wherein said unshielded means comprises a twisted pair of insulated conductors.

17. The cable of claim 16, which also includes means for causing said longitudinally extending metallic wire to be maintained closely adjacent to said unshielded means.

18. The cable of claim 15, wherein one end of said cable is adapted to be connected to means for generating signals and wherein said means substantially transparent to the balanced mode comprises a longitudinal choke which is disposed adjacent to that end of said cable which is adapted to be connected to a means for generating signals.

19. The cable of claim 15, wherein said unshielded means provides sufficient attenuation to minimize variations input impedance of the longitudinal mode to said unshielded means.

20. The cable of claim 19, wherein said unshielded means is sufficiently long to provide the attenuation.

21. The cable of claim 19, wherein said unshielded means includes a conductor which is made of a metal characterized by a unit resistance which is substantially greater than that of copper.

22. The cable of claim 21, wherein said conductor is further characterized by a useful magnetic permeability.

23. The cable of claim 19, wherein one end of said cable is adapted to be connected to means for generating signals and wherein the means substantially transparent to the balanced mode comprises a longitudinal choke which is disposed adjacent to that end of the cable which is adapted to be connected to means for generating signals and wherein said unshielded means includes a conductor which is made of a metal characterized by a unit resistance which is substantially greater than that of copper.

24. The cable of claim 23, wherein said cable has a relatively short length and which includes an unshielded twisted pair of conductors which is connected thereto, said relatively short length of cable including at least one pair of conductors with each pair of said relatively short length of cable having associated therewith a longitudinal choke.

25. The cable of claim 24, wherein said relatively short length is about eight feet.

26. The cable of claim 24, wherein the relatively short length of cable includes two drain wires.

27. A cable for transmitting communication signals and including means for suppressing electromagnetic interference, said cable comprising:
a relatively short length of cable adapted to be connected to means substantially transparent to a balanced mode of said signals and having a relatively high impedance to a longitudinal mode of said signals for decreasing substantially a longitudinal voltage on said cable, said relatively short length of cable comprising:
means including at least one conductor pair for carrying signals in a balanced mode; and
a braid which encloses said means for carrying signals in a balanced mode, said braid comprising wires made of a relatively high resistance; and
an unshielded twisted pair of conductors which is connected to said relatively short length of cable.

* * * * *